3,021,279
METHOD FOR THE SECONDARY RECOVERY OF OIL

Clyde S. Scanley, Stamford, Conn., assignor to American Cyanamid Company, New York, N.Y., a corporation of Maine
No Drawing. Filed July 31, 1959, Ser. No. 830,710
5 Claims. (Cl. 252—8.55)

This invention relates to improvements in methods for recovering petroleum from producing formations and more particularly to processes of this type in which an aqueous treating liquid is passed into the formation to increase the recovery of oil therefrom. The principal object of the invention is the prevention of plugging of the formation by the precipitation of polyvalent metal compounds such as iron compounds therein from the treating liquid. This is accomplished by employing treating fluids having dissolved therein suitable small quantities of a sequestering agent effective to prevent the precipitation of dissolved heavy metal compounds and particularly iron compounds, as will hereinafter be more fully described.

It is well known that the quantity of oil that can be recovered from a well drilled into an oil-producing limestone formation can frequently be increased by acidizing the well. In this procedure an aqueous acid such as a 10–20% aqueous hydrochloric acid suitable for opening out and enlarging channels through the limestone is pumped down the well and outwardly into the formation. In a typical acidizing treatment a quantity of 15% aqueous hydrochloric acid is pumped down the well and outwardly through the limestone formation for a distance that may vary from about 1 foot to 20 feet or more, thus opening channels in the formation and facilitating flow of the oil into the well. The quantity of aqueous acid will of course vary widely, depending on conditions in the well, and may range from 200 gallons to 1000 gallons or more for each treatment.

Another procedure commonly used for increasing the recovery of oil is known as water-flooding. In this process an aqueous flooding liquid which may be plain water or water containing viscosity-increasing solutes such as sugars, polyacrylamides and the like is forced downwardly through one or more injection wells into the oil-producing formation. The flooding liquid is forced through this formation toward an output well drilled therein, the passage of the aqueous liquid increasing the flow of oil into the well. Extremely large volumes of water are used in this procedure; for example, the quantity in a single flooding operation frequently averages as much as from 100,000 to 200,000 barrels per day.

It has been shown that polyvalent metal compounds dissolved in the water used in the above-described processes will form precipitates which may plug the oil-producing formations and interfere seriously with the recovery. In acidizing limestone formations this problem is particularly troublesome when dissolved iron is present, since it is precipitated when the aqueous treating liquid becomes neutralized by the calcium deposits. The presence of dissolved iron in flood water is also troublesome for much the same reasons, although in flood water the presence of polyvalent metal ions such as manganese, calcium and magnesium may also cause plugging. Iron and manganese, when present in small amounts, remain soluble while the flood water is slightly acid but precipitate if the water becomes neutral or alkaline by contact with limestone in the formation or from other causes. Because of the low concentration of iron in many waters and the large volumes of flooding water that must be used it is not practicable to pretreat the flood water for complete removal of the iron.

In accordance with the present invention aqueous treating liquids such as the flood waters and acidizing solutions described above are pretreated by incorporating therein certain compounds which, it has been found, will sequester iron and other similar polyvalent metal ions under alkaline conditions. The compounds used in practicing the invention are the bis-(1-carboxy-1-hydroxy) phosphinic acids and their water-soluble salts such as their alkali metal, ammonium and alkaline earth metal salts. It has been found that these compounds will sequester up to 15 molar equivalents of iron for each mol of the compound, and therefore they are effective agents when incorporated into flood water and aqueous acidizing solutions in sequestering amounts. In flood waters these amounts are concentrations of about 1 to 100 parts per million while considerably higher concentrations up to 10,000 parts per million, or 1% by weight, are used in aqueous acidizing solutions because of the much larger amounts of dissolved iron due to attack on the well casing and other metal equipment by the acid used. In flood waters the sequestrants may be added either as the free phosphinic acids or as their water-soluble salts, whereas in acidizing solutions the free acids are preferred. However the sequestrants may of course be added to acidizing solutions as salts, in which case the free sequestrant acid is most probably liberated by the large excess of hydrochloric or other acidizing acid present.

The most effective bis-(1-carboxy-1-hydroxy) phosphinic acid compounds are those produced by condensing phosphinic acid with alpha-ketoalkanoic acids of from 2 to about 19 carbon atoms, since these are the cheapest and most effective acids. Typical alpha-ketoalkanoic acids are glyoxalic acid, pyruvic acid, alpha-ketobutyric acid, alpha-ketopentanoic acid, alpha-ketooctadecanoic acid and the like. The sequestrants are produced simply by reacting approximately 2 mols of one of these acids, or of a mixture of two or more, with 1 mol of a hypophosphorous acid. The condensation products are defined accurately by the formula

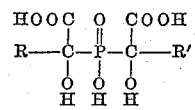

in which R and R' are hydrogen or alkyl radicals of from 1 to 17 carbon atoms. Bis-(1-carboxy-1-hydroxy-1-methyl) phosphinic acid and its water-soluble salts are the preferred compounds.

In practicing the flooding process of my invention an aqueous flooding liquid containing appropriate quantities of the above-described sequestrant is forced through an oil-bearing formation toward an output well located therein by any suitable procedure. Ordinarily the flood water is introduced into the formation through several input wells located around each production well. The flooding liquid may be plain water or it may contain other solutes such as viscosity-increasing agents of the type of sugars, polyacrylamides and the like, surface-active agents to promote preferential wetting of the formation, and other treating agents. The quantity of iron sequestrant to be used will of course depend largely on the concentration of dissolved iron in the water, and therefore will vary from about 0.002 to 100 p.p.m., based on the weight of the water. As is indicated above, quantities ranging from about 1/15 mol to about 1 mol of the bis-(1-carboxy-1-hydroxy) phosphinic acid or water-soluble salt thereof for each mol of dissolved iron will ordinarily be used.

In the acidizing process an aqueous acid which is preferably hydrochloric acid but may be nitric or other suitable acid is usually employed at a concentration of about 15%. Preferably a corrosion inhibitor such as 0.05% of diethylaniline or a proprietary product such as "Kontol 118" is added to reduce corrosion of the metal equipment. The acid is diluted with water to about 10%–15% concentration, about 0.01% to 0.5–1% of the sequestrant is added and dissolved, and the treating solution is pumped down the well and out into the formation to be acidized. The quantity of sequestrant should be such as to solubilize the iron dissolved from the metal equipment by the acid in addition to that present in the dilution water.

The following is a method for preparing a representative sequestrant suitable for use in practicing the invention. A mixture of 176 parts of pyruvic acid and 132 parts of 50% hypophosphorous acid in water is agitated at room temperature for about 3.5 hours, at which time the condensation reaction is substantially complete. The resulting solution can be added directly to an oil well flooding liquid, or the phosphinic acid can be recovered in pure form by vacuum filtration and recrystallization from acetic acid. The pure bis-(1-carboxy-1-hydroxy-1-methyl) phosphinic acid is a solid melting at about 148°–149° C. that is soluble in water and alcohol.

Bis-(1-carboxy-1-hydroxy) phosphinic acid, which is the hydrogen analog of bis-(1-carboxy-1-hydroxy-1-methyl) phosphinic acid and has the formula

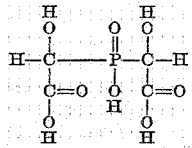

is prepared from a reaction mixture of two mols of sodium glyoxalate, one mol of sodium hypophosphate and at least three mols of hydrochloric acid. This mixture is maintained at room temperature, preferably with agitation, until the condensation is complete which requires about four hours. The product can then be added directly to a charge of aqueous hydrochloric acid to be used in acidizing a well drilled into a limestone formation.

The water-soluble salts are prepared simply by neutralizing the free acid with aqueous sodium hydroxide, potassium hydroxide or other suitable alkalies. Thus the solution obtained by reacting 176 parts of pyruvic acid with 132 parts of 50% hypophosphorous acid as described above may be neutralized to a pH of about 8–9 by adding a solution of 50% aqueous sodium hydroxide. Upon evaporation of water from the resulting aqueous solution the trisodium bis-(1-carboxy - 1 - hydroxy-1-methyl) phosphinate is obtained as a white crystalline solid which is hygroscopic and melts at 120°–128° C. but then resolidifies and remains solid at temperatures up to 300° C. The corresponding potassium, lithium and calcium salts are obtained by the same procedure, but substituting equivalent quantities of the hydroxides of these metals.

The invention will be further described and illustrated by the following specific examples which set forth preferred embodiments thereof. It will be understood however that the invention in its broader aspects is not limited by these examples, and that modifications and substitutions of equivalents may be resorted to within the scope of the appended claims.

*Example 1*

Water produced from wells often contains considerable dissolved iron as ferric bicarbonate or as ferrous bicarbonate or hydroxide. As water containing ferric bicarbonate is exposed to the atmosphere it will lose $CO_2$ and its pH will rise toward neutrality. The pH of such a water would also rise on contact with calcium carbonate rock formations. In either case the result is precipitation of ferric hydroxide. In the case of a water contaminated with ferrous hydroxide, exposure to air oxidizes iron to $Fe^{+++}$ and $Fe(OH)_3$ again precipitates.

The effectiveness of the phosphinic acids of this invention was demonstrated as follows. A water containing 5 parts per million of soluble iron at a pH of 1.5 was treated with 5 parts per million of trisodium bis-(1-carboxy-1-hydroxy-1-methyl) phosphinic acid. A sample of this treated water and an untreated sample were placed in contact with calcite and allowed to stand. The untreated sample developed a precipitate of ferric hydroxide in about fifteen minutes while the treated sample remained clear until discarded two days later.

*Example 2*

A one gram sample of trisodium bis-(1-carboxy-1-hydroxy) phosphinic acid was added to one liter of water followed by addition of a ferric chloride solution containing 0.6 gram of ferric iron. The pH was adjusted to 9.5 with sodium hydroxide and the solution was allowed to stand at room temperature. The solution remained clear and there was no precipitation of iron hydroxide.

*Example 3*

To a 15% aqueous hydrochloric acid solution there was added sufficient ferric chloride to incorparte 0.4% of ferric iron and sufficient trisodium bis-(1-carboxy-1-hydroxy-1-methyl) phosphinic acid to incorporate 0.5%. The acid was then trickled through a bed of marble chips to simulate the acidizing of an oil-producing limestone formation. The pH of the solution gradually rose toward 7 as the hydrochloric acid attacked the calcium carbonate with evolution of $CO_2$. When the acid was completely neutralized it remained clear and no iron hydroxide was precipitated. A control sample of the same iron-containing acid developed a copious precipitate of iron hydroxide when applied to marble chips by the same procedure.

This is a continuation-in-part of my copending application Serial No. 758,610, filed September 2, 1958, now abandoned.

What I claim is:

1. A method for the secondary recovery of oil from a subterranean oil-bearing limestone-containing formation which comprises forcing through said formation toward an output well located therein an aqueous flooding liquid contaminated by small quantities of dissolved iron and rendered alkaline by contact with said limestone, said flooding liquid also containing, in quantities of from about one-fifteenth mol to one mol for each mol of iron present, a compound selected from the group consisting of bis-(1-carboxy-1-hydroxy-1-alkyl) phosphinic acid and water-soluble salts thereof whereby precipitation of said iron in the formation is avoided.

2. A method according to claim 1 in which the phosphinic acid is bis-(1-carboxy-1-hydroxy-1-methyl) phosphinic acid.

3. A method according to claim 1 in which the phosphinic acid is the compound

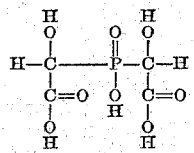

4. A method of increasing the recovery of oil from an oil-producing limestone-containing earth formation which comprises passing therethrough an aqueous liquid contaminated by small quantities of dissolved iron and rendered alkaline by contact with said limestone, said liquid also containing, in quantities of from about one-fifteenth mol to one mol for each mol of iron present, a compound selected from the group consisting of bis-(1-carboxy-1-alkyl) phosphinic acid and water-soluble salts thereof whereby precipitation of iron in the formation is avoided.

5. A method of increasing the recovery of oil from a well having a ferrous metal casing and penetrating an oil-producing limestone formation which comprises pumping an aqueous acid solution down said well and thereby contaminating it with iron dissolved from said casing and forcing the iron-contaminated solution outwardly into the formation and neutralizing the acid therein by reaction with said limestone, said solution containing from about one-fifteenth mol to one mol for each mol of iron present of a compound selected from the group consisting of bis-(1-carboxy-1-hydroxy-1-alkyl) phosphinic acid and water-soluble salts thereof whereby precipitation of said iron upon neutralization of the acid is prevented.

References Cited in the file of this patent

UNITED STATES PATENTS

| | | |
|---|---|---|
| 2,128,161 | Morgan | Aug. 23, 1938 |
| 2,246,726 | Garrison | June 24, 1941 |
| 2,678,303 | Bonewitz et al. | May 11, 1954 |
| 2,845,454 | Buckler et al. | July 29, 1958 |
| 2,852,077 | Cocks | Sept. 16, 1958 |

OTHER REFERENCES

Mehltretter et al.: Sequestration by Sugar Acids, article in Ind. and Eng. Chem., vol. 45, No. 12, December 1953, pp. 2782, 2783, and 2784.